United States Patent Office 3,714,144
Patented Jan. 30, 1973

3,714,144
PROCESS FOR THE PRODUCTION OF SUCROSE
ESTERS OF FATTY ACIDS
Reuben O. Feuge, New Orleans, Hampden J. Zeringue,
Jr., Destrehan, and Theodore J. Weiss, New Orleans,
La., assignors to the United States of America as represented by the Secretary of Agriculture
No Drawing. Filed May 29, 1969, Ser. No. 829,131
Int. Cl. C07c 69/32
U.S. Cl. 260—234 R                    10 Claims

ABSTRACT OF THE DISCLOSURE

This invention relates to a process for preparing esters of sucrose and fatty acids which acids contain from 2 to 22 carbon atoms. More particularly, this invention relates to a process for interesterifying sucrose and esters of the said fatty acids in the presence of certain alkali metal soaps which soaps function as catalysts. The mixed reactants without solvent are heated quickly above the melting point of sucrose and then the reaction is conducted at this temperature or a slightly lower temperature.

---

A non-exclusive, irrevocable, royalty-free license in the invention herein described, throughout the world for all purposes of the United States Government with the power to grant sublicenses for such purposes, is hereby granted to the Government of the United States of America.

This invention relates to the production of sucrose esters of fatty acids which acids contain from 2 to 22 carbon atoms. More specifically, it relates to a process for making mono-, di-, and higher esters of sucrose and the said fatty acids by interesterifying melted sucrose with various esters of the said fatty acids in the presence of soap or soap mixtures which soap or soap mixtures enhance the mutual solubility of the reactants and function as interesterification catalysts.

It is an additional object of the present invention to provide a novel and economical process for producing fatty acid esters of sucrose in good yields.

It is also an object of the present invention to provide a novel and economical process for producing fatty acid esters of sucrose containing relatively large proportions of monoesters which compositions are useful as surface active agents.

To those skilled in the art, additional objects will be apparent from reading the specification which follows.

The sucrose esters of the fatty acids comprise a variety of products having utility in a number of different applications. Products consisting largely of the sucrose monoesters of the common, fat-forming fatty acids, such as oleic, palmitic, and stearic, are being used as emulsifiers in various food products and as components of cosmetic formulations. The products in which monoesters predominate have been shown to perform well in household detergent formulations.

The more highly acylated esters, such as the hexa- and octaesters, made from sucrose and the long-chain, saturated fatty acids are waxy solids at room temperature and melt to viscous oils at temperatures above about 60° C. If these ester products could be manufactured economically, they would be used in food processing and as components of food products. The highly acylated esters of sucrose and drying oil fatty acids have been claimed to be preferred over the glycerides of these fatty acids because the sucrose esters possess greater functionality and therefore will perform better in paint formulations. Sucrose octa-acetate has been used as a denaturant and as a plasticizer for resins.

The fatty acid esters of sucrose can be prepared easily in the laboratory. The lower, saturated fatty acid esters can be prepared by acylation of the sucrose with the anhydride of the acid in the presence of pyridine. Esters of the higher fatty acids can be prepared by treating sucrose in a solution of pyridine and chloroform with the appropriate acid chloride. However, these laboratory procedures are not feasible for the preparation of sucrose esters which have to compete on an economic basis with other products having similar utility.

A favorite process for preparing sucrose esters for large-scale, commercial use consists of dissolving the sucrose in dimethylformamide, adding potassium carbonate to serve as an interesterification catalyst, and then adding methyl esters of glycerides of the fatty acids. The interesterification then is conducted under a partial vacuum at about 90° C. The process requires several hours, and purification of the reaction product is difficult. After purification, small but physiologically objectionable amounts of dimethylformamide or its derivatives almost invariably remain in the sucrose esters.

More recently it has been suggested that sucrose esters might be prepared more economically and without the formation of physiologically objectionable byproducts by conducting the interesterification of sucrose and methyl esters of long-chain fatty acids in propylene glycol and in the presence of a large amount of soap (about 50% based on the weight of sucrose), first dissolving the sucrose in propylene glycol, adding anhydrous potassium carbonate as catalyst, adding the methyl esters, and then increasing the temperature gradually from an original temperature of 130–135° C. to a final temperature of 165–167° C. as the propylene glycol is removed gradually by distillation under a partial vacuum. The reacting solution is said to remain clear and homogeneous throughout the process and is said to yield large proportions of sucrose monoesters.

Those skilled in the art have always believed that sucrose and fatty acid esters cannot be interesterified in the absence of a mutual solvent. Sucrose melts at about 185° C. and starts to decompose after a few minutes at its melting point. This decomposition is markedly accelerated by the presence of those acidic or basic substances which commonly are used as interesterification catalysts. Thus, when a mixture of sucrose, methyl palmitate, and a small proportion of sodium hydroxide or sodium methoxide is gradually heated under nitrogen or other inert atmosphere, a black, tarry mass forms and the sucrose degrades and evolves water even before all of the sucrose has melted. The same results are obtained when ordinary soaps are use as an interesterification catalyst.

In experimenting with the interesterification of sucrose and fatty acid esters in the absence of a solvent several unexpected discoveries were made. One of the most important discoveries was that the rate at which melted sucrose degraded in the presence of a soap such as sodium oleate, potassium palmitate, or lithium oleate, can be greatly retarded if the soap is neutral. Even a trace of free alkali was found to greatly accelerate the rate of decomposition of the sucrose. This accelerated decomposition with free alkali-containing soaps was found to occur even in the presence of esters of fatty acids. Apparently, the free alkali transfers rapidly and irreversibly into the sucrose phase.

Our alkali-free soaps which we found necessary for interesterification reactions were prepared by adding the desired amount of powdered alkali (sodium hydroxide, potassium hydroxide, or lithium hydroxide) to anhydrous methanol, refluxing the mixture under dry nitrogen until all of the alkali had dissolved, then adding the methyl ester of the selected, long-chain fatty acid, being very careful to add 2 to 5% more methyl esters than would react with the alkali, and then refluxing the mixture for 40 to 60 minutes. The anhydrous methanol was removed from the soaps by distillation under vacuum followed by stripping with dry nitrogen.

Obviously, other procedures can be devised for preparing neutral soaps for use as catalysts.

In experimenting with the interesterification of sucrose and fatty acid esters we observed that while pure sucrose melted at about 185°, it had to be cooled well below this temperature before it again crystallized. When commercial sucrose of high quality was placed in a glass flask and melted at about 185° C. and the flask then was immersed in a hot oil bath at 164° C., no recyrstallization occurred in the course of one hour. The sucrose remained viscous and darkened in color. Sucrose apparently forms supercooled solutions to a remarkable degree. Also, when sucrose is melted, minute amounts of impurities may form which depress its melting point. It also was found that sucrose in common with other organic compounds will exhibit a lowered or depressed melting point when small amounts of impurities either are present originally or are deliberately added. The important and quite unexpected point is that interesterifications with melted sucrose can actually be conducted at temperatures more than 20 centigrade degrees below the original melting point of pure sucrose.

The above-described discoveries are important factors in the new and novel interestification procedures described below. But there are several other novel aspects of these procedures. Contrary to expectations, soaps or mixtures of soaps were such good interesterification catalysts at temperatures between 170 and 185° C. that reactions between sucrose and fatty acid esters proceeded to a satisfactory degree in less than 30 minutes rather than the several hours of reaction times found necessary in the processes described heretofore by others. Also, it was discovered that sucrose molecules become much less subject to thermal degradation when at least one hydroxyl group of the molecule became acylated. Partially acylated sucrose apparently possesses a marked tendency to dissolve unacylated sucrose, thereby diluting it and tending to retard degradation.

In the novel interesterification procedures we have devised, the solid sucrose, the selected soap or soaps, and the selected types and proportions of fatty acid esters are placed in the reaction flask which is equipped with a stirring or mixing device. An inert atmosphere of nitrogen or other inert gas is placed over the reactants, and they are heated quickly to about 185° C. and held and mixed at this temperature for a short period of time sufficient to melt or dissolve the reactants and produce a fluid, uniform mass. This phase of the procedure generally requires between 4 and 20 minutes, but with other heating arrangements this operation can, of course, be conducted in a shorter period of time. After the melting and mixing a partial pressure of 1 to 10 mm. of mercury is put on the reactants while they are at 185° C., or as an alternative the flask may be cooled rapidly to about 170° C. and held at this temperature while a pressure of 1 to 10 mm. of mercury is placed over the reactants. Stirring and heating under vacuum are continued usually for 2 to 10 minutes, during which time the mono- or polyhydric alcohol originally combined with the fatty acids is removed by distillation. If desired, the reaction time under vacuum can, of course, be extended for a reasonable time without too deleterious effect on the final reaction product. When the reaction under vacuum is to be discontinued, the vacuum is broken with an inert gas and the reactants simply are cooled rapidly or an acidic solution is added to destroy the soap or soaps and then the reactants are cooled. We prefer to destroy the soap or soaps by adding as a solution in methyl Carbitol 0.67 mole of citric acid per 1.0 equivalent of soap. Higher proportions of citric acid were found to have no adverse effects on the amounts of sucrose esters obtained.

While we have operated our novel interesterification process in a batchwise manner, it is obvious to those skilled in the art that equipment operating in a continuous manner can be devised. The only requirement is that the reactants, when heated as a mixture, be heated quickly to about 185° C., reacted for a matter of minutes at this or a somewhat lower temperature and under vacuum, and then cooled rapidly. In heating the reactants quickly it is not even necessary that all be heated rapidly; that is, it is not necessary to mix all the reactants at a low temperature and then heat them together to the reaction temperature. The soap or soaps and the esters of the fatty acids used as starting material are relatively resistant to thermal degradation at the reaction temperature and can be preheated separately. The sucrose is the only component critically sensitive to degradation when held for an extended time at the reaction temperature. The only requirement is that the melting of sucrose and the starting of the reaction after all the reactants are present require not more than about 20 minutes.

To purify the reaction product, it is dissolved in 1-butanol and washed with a solution of 5% sodium chloride in water. After the water washing the butanol is removed by heating the solution under a vacuum while stripping it with dry nitrogen. Finally, the residue from the distillation is extracted with warm chloroform, which dissolves the sucrose esters but which does not take up any small amounts of unreacted sucrose. The chloroform extract contains all of the sucrose esters, any unreacted fatty acid esters used as starting material in the interesterification, and the fatty acid from the soap used as catalyst.

The procedure for purifying the reaction product is not unique or novel. It is only one various procedures which might be used. The procedure described was found not to degrade sucrose esters and was selected so that accurate analyses of the reaction products could be made.

The purified reaction products were analyzed by a thin-layer chromatographic technique. A measured amount of chloroform solution containing a known proportion of purified reaction product was spotted on a silica gel plate and the spots were developed with a solution consisting of 10 volumes toluene, 5 volumes ethyl acetate, and 5 volumes of 95% ethanol. The plates were dried and were sprayed with a solution of 1 g. urea in 4.5 ml. of 85% phosphoric acid which solution had been dissolved in 48 ml. of 1-butanol saturated with water. Heating these treated plates at 110° C. for 0.5 hour produced a series of brown spots indicating both the type of sucrose ester (mono-, di-, etc.) and the amount of each. The amounts were measured quantitatively with the aid of a recording densitometer. Sucrose esters prepared and characterized by established laboratory techniques were used for control purposes.

Because sucrose melts at about 185° C., a temperature at which a rapid rate of interesterification was found to occur, and because sucrose does degrade when held at its melting point and the tendency to degrade increases as the temperature increases about 185° C., it is obviously undesirable to practice our invention at temperatures above about 190° C. Some reactions were conducted at the latter temperature. Also, we have discovered that the rate of interesterification slows markedly as the reaction temperature is decreased below 170° C. We believe the interesterification rate in our process to be impractical at temperatures below about 170° C.

A series of interesterifications was conducted in which the mole ratio of sucrose to methyl Carbitol palmitate (the palmitic acid ester of methyl carbitol, $$CH_3-O-CH_2-CH_2-O-CH_2-CH_2-OH)$$

was 1.0 to 0.8. Sodium oleate was used as a catalyst and emulsifier. The proportion of sodium oleate, calculated as a percentage of the weight of sucrose used, in three of these interesterifications was 10%, 20%, and 30%, respectively. In each of these reactions the reactants were heated from room temperature to 185° C. and thoroughly mixed in the course of 7 minutes. Then in each case the reaction flask was transferred to an oil bath at 170° C., and the reaction was continued with stirring under vacuum for 10 minutes. The reaction was stopped by breaking the vacuum with nitrogen gas and adding a solution of citric acid in methyl Carbitol (1.1 moles citric acid per mole of sodium oleate). The chloroform extract of each of the reaction products was analyzed and the data recorded in Table I were obtained.

TABLE I

| Product | Sodium oleate, based on wt. of sucrose | | |
|---|---|---|---|
| | 10% | 20% | 30% |
| Sucrose esters in chloroform soluble fraction, wt. percent | 18.3 | 41.6 | 24.9 |
| Composition of sucrose esters, wt. percent: | | | |
| Monoesters | 28.7 | 30.0 | 41.5 |
| Diesters | 49.8 | 47.3 | 49.1 |
| Tri- and higher esters | 19.6 | 20.0 | 7.5 |

In the experiments described above, it is obvious that the greatest proportion of sucrose esters was produced when the sodium oleate employed as catalyst was used at a level of 20% by weight of the sucrose employed in the reaction. However, sucrose esters were also produced at the other levels. At the 30% level the total yield of sucrose esters was lower than at 20% but the proportion of monoesters in the sucrose esters was higher. Considering the yields and the fact that increasing the level of sodium oleate increases the cost of producing sucrose esters, it is evident that one would not use sodium oleate above a level of about 40% based on the weight of the sucrose employed. The lower level of sodium oleate to be employed could well be below 10%, but it will have to be above 0%. In the experiment similar to the three cited, no sucrose esters were produced when the sodium oleate was omitted from the reactants.

The preferred catalysts for use in our novel interesterification reaction belong to the class of compounds known as the soaps of the alkaline metals. However, not all of these compounds are satisfactory catalysts. To establish the performance of individual catalysts and catalyst mixtures a series of interesterifications was conducted using sucrose and methyl Carbitol palmitate in a mole ratio of 1 to 1, except in one case, which will be noted. In each experiment the reactants, including the selected catalyst, were heated from room temperature to 185° C. and mixed in the course of 7 minutes. Then the reaction flask was transferred to an oil bath at 170° C., and the reaction was continued for 10 minutes under vacuum (a pressure of 1-3 mm. of mercury) and with constant mixing. The reaction was stopped by breaking the vacuum with nitrogen gas and adding to the reactants a solution of citric acid in methyl carbitol in an amount equal to 1.1 mole citric acid per mole of soap. The reaction products were taken up in 1-butanol and washed with a salt solution as described before. The 1-butanol was removed and the residue was extracted with chloroform and analyzed. The data obtained are recorded in Table II.

All of the soaps and soap mixtures represented in Table II, except lithium palmitate, were able to function as catalysts in the interesterification reaction under the particular conditions employed. Lithium oleate was one of the best catalysts, but 94.5% of the sucrose esters produced with this catalyst contained three or more acyl groups per molecule. When the data for Experiment No. 5 are compared with that for Experiment No. 7, it is evident that the addition of lithium oleate at a 2% level enhanced the reactivity of the potassium palmitate. A similar enhancement is evident on comparing Experiments Nos. 3 and 6. It is believed but not established that lithium palmitate, Experiment No. 2, exhibited no catalytic activity because it was essentially insoluble in the reactants. Also, it is believed but not established that the soaps which were catalytically active performed two functions: (1) they solubilized at least a portion of the reactants, and (2) they actually catalyzed the interesterification.

In addition to the soaps reported in Table II other soaps of the fat-forming acids and lithium, sodium, and potassium were tested for catalytic activity. All were catalysts except the lithium soaps of the long-chain, saturated fatty acids. However, the soaps of the short-chain, fat-forming acids, such as butyric and caproic, were relatively poor catalysts.

Our procedure for interesterifying sucrose and fatty acid esters can be employed to prepare sucrose esters of all the fatty acids from $C_2$ through $C_{22}$. Sucrose acetates were prepared in an experiment identical with Experiment No. 3 in Table II, except that sucrose and methyl Carbitol acetate mixed in a 1:1 mole ration were substituted for the sucrose and methyl Carbitol palmitate which had been used in a 1.0:0.8 mole ratio. In other similar experiments sucrose esters of oleic acid, the fatty acids of hydrogenated cottonseed oil, the fatty acids of hydrogenated solybean oil, and the fatty acids of unhydrogenated cottonseed oil were prepared.

In our interesterification procedure the fatty acids are employed in the form of esters. We have successfully used esters of methyl Carbitol $(CH_3—O—CH_2—CH_2—O—CH_2—CH_2—OH)$ methyl Cellosolve $(CH_3—O—CH_2—CH_2—OH)$, methanol, and glycerol. Esters of the latter included a hydrogenated cottonseed oil, monoglycerides, diglycerides, and mixtures of mono-, di-, and triglycerides. In our interesterifications we prefer to remove the alcohol portions of these fatty acid esters by vacuum distillation during the reaction, but this is not always necessary. For example, if the reaction product is to be used in foods and if a natural or hydrogenated fat is used as the fatty acid ester, the partially esterified glycerides which will remain in the reaction product if a vacuum distillation is not conducted will do no harm. To those skilled in the art it is obvious

TABLE II

| Experiment number | Catalyst | | Sucrose esters in fatty fraction (CHCl₃ extract), wt.³ percent | Composition of sucrose esters, wt. percent | | |
|---|---|---|---|---|---|---|
| | Type | Amount calculated on sucrose basis, wt. percent | | Mono- | Di- | Tri- anr highes esters |
| 1 | Lithium oleate | 30 | 43.9 | 1.5 | 4.0 | 94.5 |
| 2 | Lithium palmitate | 30 | 0 | 0 | 0 | 0 |
| 3ᵃ | Sodium oleate | 30 | 24.9 | 41.5 | 49.1 | 7.5 |
| 4 | Sodium palmitate | 30 | 11.5 | 51.6 | 33.8 | 14.6 |
| 5 | Potassium palmitate | 30 | 11.8 | 30.6 | 36.1 | 33.3 |
| 6ᵃ | Sodium oleate plus | 30 | | | | |
| | Lithium oleate | 5 | 48.7 | 35.0 | 37.8 | 27.2 |
| 7 | Potassium palmitate plus | 30 | | | | |
| | Lithium oleate | 2 | 17.0 | 36.8 | 31.1 | 26.6 |
| 8 | Potassium palmitate plus | 30 | | | | |
| | Lithium oleate | 5 | 19.0 | 36.2 | 28.2 | 28.0 |

ᵃ Mole ratio of sucrose to methyl carbitol palmitate was 1.0:0.8.

that fatty acid esters of mono- and polyhydric alcohols other than those mentioned can be used in the practice of our invention.

Some fatty acid esters are better than others for use as starting materials. For example, when methyl palmitate was under interesterification conditions similar to those used to obtain the products represented in Table II the yield of sucrose esters was approximately one-fourth that which would have been obtained if methyl Caribitol palmitate had been substituted for the methyl palmitate on a mole-for-mole basis. This difference in effective reactivity sometimes can be overcome by forming the preferred fatty acid ester in situ. For example, when the experiment with methyl palmitate was repeated and methyl Carbitol equivalent to approximately four times that required to react with the methyl palmitate was added before heating of the mixture was begun, methyl Carbitol palmitate formed and alcohol boiled off before the reaction with sucrose had proceeded to a significant extent.

As is well known to those skilled in the art, esters of a polyhydric compound resulting from an interesterification reaction have a composition usually dependent in large measure upon the mole ratio of fatty acid groups to polyhydric compound used in the reaction. Thus, if the objective of the interesterification of sucrose and methyl Carbitol palmitate is to provide a product rich in sucrose monopalmitate, the mole ratio of sucrose to methyl Carbitol palmitate should be greater than 1:1. If a product rich in highly acylated sucrose is desired, this ratio should be much lower. These generaly relationships were found to hold for our process when soaps of sodium and potassium were used as catalysts. For some unknown reason, reactions catalyzed only by lithium soaps of unsaturated fatty acids always produced products rich in the higher esters of sucrose.

In order to more clearly disclose the nature of our invention, specific examples illustrating the present invention will hereinafter be described. It should be understood, however, that this is done solely by way of example and is intended neither to delineate the scope of the invention nor limit the ambit of the appended claims.

EXAMPLE 1

Into a 100-ml., round-bottom, glass reaction flask there was placed 8 g. (0.023 mole) of powdered sucrose, 3.9 g. (0.011 mole) of the palmitic acid ester of methyl Carbitol ($CH_3$—O—$CH_2$—$CH_2$—O—$CH_2$—$CH_2$—OH), and 2.4 g. (30% based on the weight of sucrose) of alkali-free sodium oleate. To the reaction flask was added a Teflon-coated, magnetic stirring bar and the reactants were put under an atmosphere of dry nitrogen. The flask was immersed in an oil bath preheated to 185° C. by a combination hot plate and magnetic stirring apparatus. The reaction flask and contents then were brought to the temperature of the oil bath (185° C.) and mixed during the course of 14 minutes. Then the reaction flask and its contents were transferred to a second oil bath preheated to 170° C. by a second hot plate-magnetic stirrer apparatus. A partial pressure of 1–3 mm. mercury was produced and maintained over the reactants to remove methyl Carbitol while the reaction was continued with constant mixing for a period of 10 minutes. At the end of this period the partial vacuum was broken with dry nitrogen and 20 ml. of methyl Carbitol containing 1.84 g. citric acid (1.11 mole citric acid per mole soap) was added quickly. Then the reactants were cooled rapidly to room temperature. The reactants were dissolved in 1-butanol and washed with a solution of 5% sodium chloride in water. The 1-butanol fraction was heated under vacuum and a stream of dry nitrogen was passed through the solution to remove the 1-butanol. The residue was dissolved in chloroform and analyzed for content of total sucrose palmitates and content of sucrose palmitates of different degrees of acylation. The content of total sucrose palmitates was found to be 48.2% by weight. The composition of the sucrose palmitate fraction was found to be 48.0% monopalmitate, 38.9% dipalmitate, 9.6% triplamitate, and 0.9% tetrapalmitate.

EXAMPLE 2

Into a 100-ml., round-bottom, glass reaction flask there was placed 5.00 g. (0.0146 mole) powdered sucrose, 5.01 g. (0.014 mole) palmitic acid ester of methyl Carbitol, and 1.5 g. (30% based on the weight of sucrose) alkali-free sodium oleate. To the flask was added a Teflon-coated, magnetic stirring bar and the reactants were put under an atmosphere of dry nitrogen. The flask and contents were immersed in an oil bath preheated to 185° C. by a combination hot plate and magnetic stirring apparatus. After mixing for 7 minutes at atmospheric pressure, the pressure was reduced to 1–3 mm. mercury to distill off methyl Carbitol, and the reaction was continued under this reduced pressure for 5 minutes. At the end of this time the partial vacuum was broken with dry nitrogen, 20 ml. of methyl Carbitol containing 1.15 g. citric acid was added rapidly, and the reactants were cooled rapidly to room temperature and then fractionated as in Example 1. The content of sucrose palmitates in the fatty fraction was found by analysis to be 67.0%. The composition of the sucrose palmitates was found to consist of 35.1% monopalmitates, 46.7% dipalmitates, and 16.5% tripalmitates.

EXAMPLE 3

In a 100-ml., round-bottom, glass reaction flask there was placed 5.00 g. (0.014 mole) powdered sucrose, 4.82 g. (0.014 mole) monopalmitin, and 1.0 g. (20% based on the weight of sucrose) alkali-free sodium oleate. To the flask was added a Teflon-coated magnetic stirring bar and the reactants were put under an atmosphere of dry nitrogen. The flask and contents were immersed in an oil bath preheated to 185° C. by a combination hot plate and magnetic stirring apparatus. After mixing for 7 minutes at atmospheric pressure, the flask and contents were transferred to a second oil bath preheated to 170° C. by a combination hot plate and magnetic stirrer apparatus. The pressure was reduced to 1–3 mm. mercury and the reaction was continued for 8 minutes. Then the partial vacuum was broken with dry nitrogen, 20 ml. of a methyl Carbitol containing 0.32 g. citric acid (all at room temperature) was added rapidly, and the mixture was rapidly cooled. The reaction product was fractionated and analyzed as in Example 1. The content of sucrose palmitates in the fatty portion was found to be 55.6% by weight. The composition of the sucrose palmitates was found to be 38.3% sucrose monopalmitates, 38.3% sucrose dipalmitates, 13.0% sucrose tripalmitates, and 9.6% sucrose tetrapalmitates.

EXAMPLE 4

In a 100-ml., round-bottom, glass reaction flask there was placed 5.00 g. (0.0146 mole) powdered sucrose, 4.56 g. (approximately 0.0073 mole) molecularly distilled diglycerides derived from completely hydrogenated soybean oil, 1.00 g. alkali-free potassium oleate (20% based on the weight of the sucrose). To the flask was added a Teflon-coated magnetic stirring bar and the reactants were put under an atmosphere of dry nitrogen. The flask and contents were immersed in an oil bath preheated to 185° C. by a combination hot plate and magnetic stirring apparatus. After mixing for 7 minutes at atmospheric pressure, the flask and contents were transferred to a second oil bath preheated to 170° C. by a combination hot plate and magnetic stirrer apparatus. The pressure was reduced to 1–3 mm. mercury to remove free glycerol as it formed, and the reaction was continued for 10 minutes. Then the partial vacuum was broken with dry nitrogen, 20 ml. of methyl carbitol containing 0.55 g. citric acid (all at room temperature) was added quickly and the mixture was cooled rapidly. The reaction product was fractionated and analyzed as in Example 1. The content of sucrose esters in the fatty portion was found to be 37% by weight. The sucrose esters were found to consist of 40.0% monoesters, 39.5% diesters, 8.4% triesters, and 10.2% tetraesters.

EXAMPLE 5

In a 500-ml., round-bottom, glass reaction flask equipped with a stainless steel, paddle-type stirrer inserted through a stuffing box there was placed 38.64 g. (0.1169 mole) monopalmitin, 10 g. (20% based on the sucrose to be used) alkali-free potassium oleate and 2.50 g. (5% based on the sucrose to be used) alkali-free lithium oleate. The reactants were put under an atmosphere of nitrogen. Then the flask and contents were immersed in an oil bath heated to and maintained at 187° C., and the motor attached to the paddle stirrer was started. The monopalmitin and soaps were heated to 187° C. Powdered sucrose in the amount of 50.00 g. (0.1461 mole) was placed in a polyethylene bag attached to one of the necks of the reaction flask. The interesterification with sucrose was started by forcing about one-third of the sucrose into the stirred monopalmitin-soaps solution. After 2 minutes the second one-third portion of sucrose was added, and 4 minutes after the start of the reaction the final one-third of sucrose was added. Seven minutes after the start of the reaction with sucrose, the pressure over the reactants was reduced to 1-3 mm. mercury, and free glycerol was distilled through a glass side-arm attached to the flask. Exactly 5 minutes after evacuation of the flask was started, the vacuum was broken with nitrogen gas, the flask was removed from the oil bath, and the reactants were cooled quickly.

The reactants were dissolved in 1-butanol and washed once with an aqueous solution containing 5% sodium chloride and 5.67 g. citric acid. The latter amounted to 0.67 mole of citric acid per 1.00 mole of soaps. Subsequently, the 1-butanol solution was washed twice with an aqueous solution containing only 5% sodium chloride. The 1-butanol fraction was heated under vacuum and a stream of nitrogen was passed through the solution to remove the 1-butanol. The residue was dissolved in chloroform, and a small amount of insoluble salt and sucrose was removed. The fatty portion recovered from the chloroform weighed 49.5 g. This fatty portion was analyzed for content of total sucrose palmitates and content of sucrose palmitates of different degrees of acylation. The content of total sucrose palmitates was found to be 52.5% by weight. The composition of the sucrose palmitate fraction was found to be 37.9% monopalmitate, 42.5% dipalmitate, 13.3% tripalmitate, and 5.5% higher palmitates.

EXAMPLE 6

The preparation described in Example 5 was repeated except that 41.92 g. (0.1169 mole) methyl Carbitol palmitate was substituted for the monopalmitin. The fatty portion recovered from the chloroform solution weighed 43.8 g. It analyzed 30.0% sucrose palmitates. The composition of the sucrose palmitate fraction was found to be 51.7% monopalmitate, 33.4% dipalmitate, 9.9% tripalmitate, and 2.5% higher palmitates.

We claim:

1. The process of producing sucrose esters of fatty acids having 2 to 22 carbon atoms which process comprises melting and mixing the sucrose in the course of 2 to 20 minutes with esters of the fatty acids and a catalyst consisting of the alkali-free sodium or potassium soaps of saturated or unsaturated fatty acids or the alkali-free lithium soaps of unsaturated fatty acids or mixtures of such soaps, then conducting the resulting reaction mixture under a partial vacuum in the course of 2 to 20 minutes at a temperature ranging between 170° C. and 190° C., which removes the alcohol or alcohol-like portions of the fatty acid esters as these portions are liberated by the interesterification reaction with sucrose and then cooling the reaction mixture and purifying it by removing the uncombined sucrose and either removing the soap or soaps or acidifying the soap or soaps and removing the alkali metal portions.

2. The process as defined by claim 1 wherein the proportion of soap or soaps selected from the alkali-free sodium or potassium soaps of saturated or unsaturated fatty acids or alkali-free lithium soaps of the unsaturated fatty acids ranges between 2% and 40% based on the weight of sucrose used.

3. The process as defined by claim 1 wherein the mixing of the reactants and the interesterification are conducted at the same temperature, which is above the melting point of sucrose.

4. The process as defined by claim 1 wherein the mixing of the reactants is conducted above the melting point of sucrose and the interesterification is conducted at a lower temperature, but above 170° C.

5. The process as defined by claim 1 wherein the fatty acid esters used in the interesterification are esters of methyl carbitol having the formula

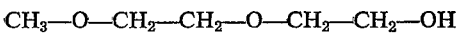

$$CH_3-O-CH_2-CH_2-O-CH_2-CH_2-OH$$

6. The process as defined by claim 1 wherein the fatty acid esters used in the interesterification are esters of methyl cellosolve having the formula

$$CH_3-O-CH_2-CH_2-OH$$

7. The process as defined by claim 1 wherein the fatty acid esters used in the interesterification are mono-, di-, or triglycerides or mixtures of such glycerides.

8. The process as defined by claim 1 wherein the esters used in the interesterification are essentially esters of palmitic, stearic, oleic, or linoleic acids or their mixtures.

9. The process as defined by claim 1 except that a partial vacuum is not formed over the reactants to removes the alcohol or alcohol-like portions of the fatty acid esters as these portions are liberated by the interesterification reaction.

10. The process as defined by claim 1 wherein the ratio of fatty acid equivalents to moles of sucrose ranges between 0.5:1.0 and 8.0:1.0.

References Cited

UNITED STATES PATENTS

| | | | |
|---|---|---|---|
| 2,831,855 | 4/1958 | Martin | 260—234 |
| 2,893,990 | 7/1959 | Hass et al. | 260—234 |
| 3,249,600 | 5/1966 | Nobile et al. | 260—234 |
| 3,558,597 | 1/1971 | Von Brachel et al. | 260—234 R |

LEWIS GOTTS, Primary Examiner

J. R. BROWN, Assistant Examiner